United States Patent [19]

Turukhano

[11] Patent Number: 4,715,670
[45] Date of Patent: Dec. 29, 1987

[54] APPARATUS FOR COPYING HOLOGRAPHIC DIFFRACTION GRATINGS

[76] Inventor: Boris G. Turukhano, ulitsa K.Podryadchikova, 16, kv. 37, Leningradskaya oblast, Gatchina, U.S.S.R.

[21] Appl. No.: 885,099

[22] Filed: Jul. 14, 1986

[51] Int. Cl.⁴ .............................................. G03H 1/20
[52] U.S. Cl. .................................................... 350/3.69
[58] Field of Search ........................... 350/3.69; 354/15

[56] References Cited

U.S. PATENT DOCUMENTS 4,416,540  11/1983  Nicholson ........................... 350/3.69

OTHER PUBLICATIONS

D. B. Brumm, "Double Images in Copy Holograms," *Applied Optics*, vol. 6, No. 3, 1967, pp. 588–589.

*Primary Examiner*—Bruce Y. Arnold
*Assistant Examiner*—Martin Lerner

[57] ABSTRACT

An apparatus for copying holographic diffraction gratings comprises a coherent radiation source and, arranged successively one after another downstream the coherent radiation, a collimating system, a mirror, a master holographic grating, and a copy holographic grating. The master and copy gratings are rigidly secured to each other and face each other by their recording layers. The mirror is adapted for reciprocal travel along the length of the master holographic grating so that coherent radiation reflected by the mirror falls on said master grating.

2 Claims, 3 Drawing Figures

APPARATUS FOR COPYING HOLOGRAPHIC DIFFRACTION GRATINGS

FIELD OF THE INVENTION

This invention relates generally to holography and in particular to devices for copying holographic diffraction gratings.

The invention can be used in machine-tool industry, measuring microscopy, metrology, holographic memories, holographic cinema and television, and information storage systems.

The invention can be most effectively used to make copies of holographic diffraction gratings for displacement sensors and replicas of holograms.

BACKGROUND OF THE INVENTION

Known in the art is a device for making composite copies of cut diffraction gratings, comprising an illuminating system and, arranged one after another in the direction of the luminous radiation, a collimating system, a transparent cut grating composed of a substrate with rulings cut therein, a substrate of the copy grating and two reflecting cut diffraction gratings which are master gratings facing the copy substrate by their rulings, the transparent grating, as well as the substrate of the copy grating and the illuminating system being secured stationary in relation to other master gratings adapted to be displaced (cf., for example, F. A. Mitin, A. M. Nizhin, G. N. Rassudova: Composite Copies of Measuring Diffraction Gratings, in Optiko-Mekhanicheskaya Promyshlennost, in Russian, 1975, No. 9, pp. 47–50).

This device makes use of the contact duplication process and operates as follows. Two master gratings are placed on the substrate of the copy grating and adjusted by means of the interference moire bands which can be seen at the place of contact of the master gratings. Then the master gratings are removed, resin is poured over the substrate, and master gratings are again very carefully placed on the substrate, pressed against this substrate by means of spring supports. The arrangement is checked by the moire band pattern. Additional adjustment is performed if necessary during the 15–20 minute period until gel formation is completed. After bonding, in about two hours, the excess of resin is removed, and in 18–20 hours the copy hologram is separated from the master gratings, washed in distilled water to get rid of the chemical substances used in the copying process. This device can be used to produce composite copies comprising any number of sections. To this end, one of the master gratings is separated from the two-section copy which has two master gratings bonded thereto and bonded to the free space on the substrate at the end of the second master grating. In this manner composite copies can be made and the number of rulings can reach 1,200 for 1 mm.

But this device is deficient in that the relative position of the master gratings being copied can be performed with an accuracy of a/10, where a is the grating constant or the slit spacing period. The mechanical wear of the master gratings is the reason of the gradual deterioration of this accuracy.

In addition, the device offers no means to trim the edge of the master gratings exactly parallel to the rulings and with an accuracy of one slit period. There are portions which are not ruled at all. The surface of these portions is prominent in relation to the rest of the grating, producing so called "ladders".

Even minute "ladders" are inadmissible in high-quality spectroscopic composite copies, and they are bound to appear due to inaccurate adjustment of the surfaces of the master gratings in one plane.

Moreover, the adjusted master gratings have to be separated from the surface of the copy grating to pour the resin over its surface. So the master gratings are separated from the copy grating and then reinstalled, the adjustment is done again. The technological process, therefore, becomes far too complicated.

One more disadvantage consists in the slow polymerization of resin, which lasts for about 20 hours and makes the copying process too lengthy. In case a large number of copies is to be obtained within this period, the number of copies should be equal to the number of master gratings, which is economically inefficient. In addition, mechanical treatment of the original grating is detrimental to its quality.

It is common knowledge that holography gratings are superior in many respects to cut diffraction gratings. Their frequency can reach 6,000 lines/mm in the optical range, the size being the same.

Master holography gratings are recorded by means of a contactless interference technique. A larger frequency can be put into gratings of the same length. The length and frequency of cut diffraction gratings is limited in principle by the geometrical dimensions of a cutting tool, its wear during the cutting process and impossibility to replace the tool during this process.

The use of a coherent radiation source for interference copying results in less stringent requirements to the size of the gap between the master hologram and its copy. In case of incoherent illumination, this gap should be of the order of the grating pitch. Thus, when the frequency of the grating is 1,000 lines/mm, the grating pitch is 1 micrometer. A gap of 1 micrometer is impossible to maintain, particularly when the substrate is long enough. With the coherent radiation the gap can be several hundreds of microns and more. However, the gap should not be widened excessively up to several centimeters between the master hologram and its copy, since double images can be produced - two virtual and two real ones (cf., D. B. Brumm, Double Images in Copy Holograms, Applied Optics, 1967, v. 6, No. 3, pp. 588–589).

Known in the art is a device for copying hologram gratings, comprising a coherent radiation source and, arranged one after another in the direction of the coherent radiation, a collimating system, a master hologram grating composed of a substrate and a recording layer, and a copy grating which is a substrate with a recording layer, the master grating and the copy hologram being rigidly secured to each other and face each other by their recording layers (cf., for example, V. A. Vanin, L. N. Vagin, Interference Copying of Microholograms, Zhurnal nauchnoi i prikladnoi fotografiii i kinotekhniki, in Russian, 1975, vol. 20, issue No. 6, pp. 416–422).

This device makes use of the interference copying process and operates as follows.

A part of the collimated beam of coherent radiation, which is incident upon the hologram grating, diffracts thereon, whereas a part of this beam passes without deviation. These two beams interfere and produce, in the plane of the recording layer of the copy hologram, a standing wave image identical to the one in which the master hologram was recorded. If the collimated beam during copying is the same as one of the beams during the master hologram recording, the interference copying of the hologram grating takes place.

In this case the mechanical contact between the master and copy holograms is no longer used. This helps preserve the master hologram and the copies are more accurate. With the proper photochemical treatment, the copy hologram is very close to the master hologram. But this device is deficient in that copying can only be performed within the limits of the collimating system.

SUMMARY OF THE INVENTION

It is an object of the invention to obtain a copy hologram grating whose size is larger than the aperture of the collimating system.

This is achieved in that a device for copying holographic diffraction gratings, comprising a source of coherent radiation and, arranged one after another downstream coherent radiation stream, a collimating system, a master holographic grating composed of a substrate and a recording layer, and a copy grating which is a substrate having a recording layer, the master holographic grating and the copy grating being rigidly secured together so that their recording layers face each other, according to the invention, is provided with a mirror arranged between the collimating system and the master holographic grating downstream the coherent radiation and adapted to reciprocate along the length of the master holographic grating so that the coherent radiation reflected by the mirror is directed to the master grating.

In order to achieve maximum diffraction efficiency the mirror can be placed, in relation to the master holographic grating, at an angle $\alpha=45°+(Q/4)$, where $Q/2$ is the angle between the direction of coherent radiation and the normal to the surface of the recording layer of the master holographic grating.

This device made according to the invention can make copies of holographic diffraction gratings, whose size is larger than the aperture of the collimating system. The diffraction efficiency achieved by this device is maximum. Many other indispensable conditions are attained, such as the high resolution of the recording layer of the copy hologram, and adequate diffraction efficiency of the master holographic diffraction grating.

BRIEF DESCRIPTION OF THE ACCOMPANYING DRAWINGS.

This and other objects and advantages of the present invention will become apparent from the following detailed description of preferred embodiments thereof, taken in conjunction with the accompanying drawings, wherein.

DETAILED DESCRIPTION OF THE INVENTION

Figure 1:
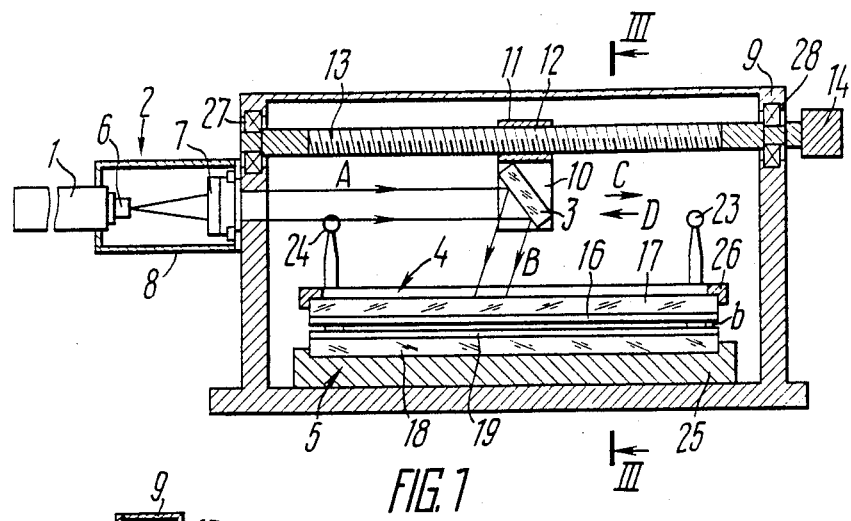
FIG. 1 shows a longitudinal section view of a general schematic of an apparatus for copying holographic gratings, according to the invention.

An apparatus for copying holographic diffraction gratings, according to the invention, can be used both for contact and interferential copying. The embodiment described below makes use only of the interferential copying process.

An apparatus for copying holographic diffraction gratings, according to the invention, comprises a source 1 (FIG. 1) of coherent radiation and, arranged one after another in the direction A,B of coherent radiation, a collimating system 2, a mirror 3, a master holographic diffraction grating 4, and a copy holographic grating 5.

In this embodiment of the apparatus the source 1 of coherent radiation is a laser. The collimating system 2 comprises a diverging lens 6 and a collimating lens 7 rigidly secured together by a holder 8. The source 1 and the holder 8 with the lenses 6 and 7 are rigidly secured to a housing 9.

The mirror 3 of the apparatus, according to the invention, is arranged so that it can reciprocate in the direction of the arrows C and D along the length of the master holographic grating 4 to direct coherent radiation reflected by the mirror 3 to the master holographic grating 4. To this end, the mirror 3 is secured in a holder 10 rigidly secured to a coupling 11 having an internal thread 12 adapted to travel on a screw 13 which has one of the butt ends thereof installed on the output shaft of a motor 14, while the other butt end rests in the housing 9.

Figure 2:
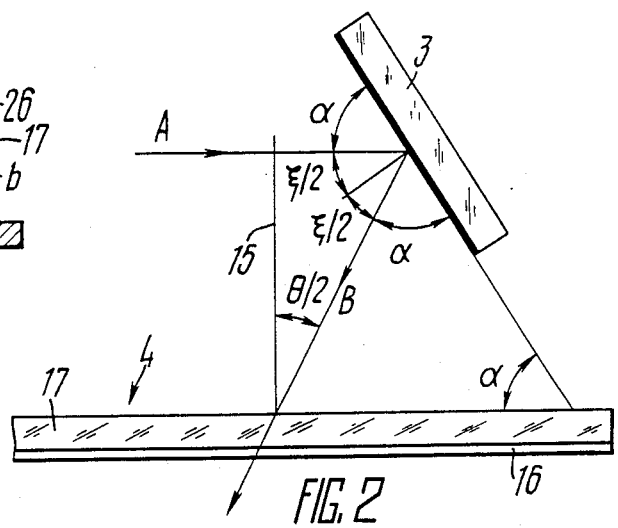
FIG. 2 shows an enlarged section view of a mirror and a master holographic grating of the apparatus of FIG. 1, according to the invention.

In order to obtain the maximum brightness of the copy image, the mirror 3 (FIG. 2) is arranged, in relation to the master holographic grating 4, at an angle $\alpha-45°=Q/4$ where $Q/2$ is the angle between the direction B of coherent radiation and a normal 15 to the surface of a recording layer 16 of the master grating 4.

The maximum diffraction efficiency can be achieved when the copy hologram 5 is recorded at the same angle to the normal thereof, at which the master hologram was recorded. The angle $\alpha$ of inclination of the mirror 3 to the master hologram 4 can be defined as the function of the angle $\theta$ between the axes of the interferometer beams during the recording of the original hologram 4. Using the geometric disposition of the mirror 3 and the master hologram 4 and the principles of light reflection from the surface of the mirror 3, the following equations can be written:

$$2\alpha + \xi = 180°, \qquad (1)$$

$$\xi = 180° - 90° - (Q/2), \qquad (2)$$

where $\xi$ is the angle between the directions A and B of coherent radiation.

In accordance with the equation (1) $\alpha=(180°-\xi/2)$.

Taking the value of $\xi$ from equation (2) the equation can be given by:

$$\alpha = 45° + (Q/4). \qquad (3)$$

In this embodiment of the apparatus according to the invention:

$$\alpha = 45° + 9°23' = 54°23'.$$

The master hologram 4 (FIG. 1) is a holographic diffraction grating comprising a substrate 17 and said recording layer 16. The copy hologram 5 comprises a substrate 18 having a recording layer 19. The recording layers 16 and 19 face each other, their extended surfaces are parallel to each other and separated by a gap. In this embodiment the recording layers 16 and 19 are photosensitive layers. The master and copy holograms 4 and 5 are rigidly secured together for the duration of the copying process.

Figure 3:
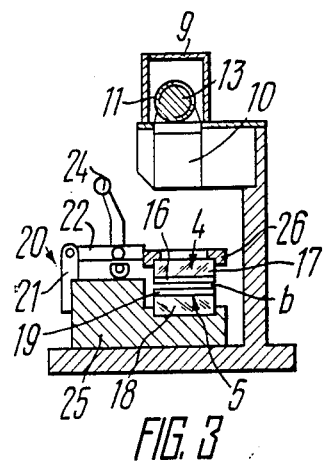
FIG. 3 shows a view taken along line III—III of FIG. 1, according to the invention.

To change the copy hologram 5 the apparatus, according to the invention, is provided with a handler 20 (FIG. 3).

The handler 20 is a linkage comprising levers 21 and 22 and grips 23 and 24 (FIG. 1). The lever 21 (FIG. 3) is secured in a mount 25 installed in the housing 9. The grips 23 and 24 are fixed in the lever 22 and are used to adjust the master hologram 4 in relation to the copy hologram 5 which is placed on the mount 25 during the copying process. The lever 22 is rigidly secured to a frame 26 wherein the master hologram 4 is located.

The screw 13 (FIG. 1) is fixed in the housing 9 in bearings 27 and 28.

The apparatus for copying holographic diffraction gratings, according to the invention, operates as follows.

A coherent radiation beam from the source 1 (FIG. 1) passes the collimating system 2, is reflected from the mirror 3 and is incident on the master hologram 4 at an angle $Q/2$ (FIG. 2) in relation to the normal 15. When the plane wave of coherent radiation passes the master hologram 4 and the recording layer 16 thereof, it is modilated in accordance with the amplitude-phase distribution in the recording layer 16 and a part of this wave is diffracted in this layer 16 and interferes with the part of the wave, which has passed therethrough without changing its direction, in the area of the recording layer 19 of the copy hologram 5. Standing waves identical to those in which the master hologram 4 had been recorded are produced. These waves are recorded by the copy hologram 5. The mirror 3 is carried along the length of the master hologram 4 and the whole length of the copy hologram 5 is exposed. This is equivalent to the illumination of the master hologram 4 by a light beam produced by an aperture equal to the patch length of the mirror 3. The speed of travel of the mirror 3 is selected on the basis of the exposure required for the recording layer 19 which depends on its photosensitive curve in order to obtain the maximum diffraction efficiency $\eta_{max} \cdot S$. The value $\alpha = 45° + (Q/4)$ is also optimal to obtain $\eta_{max}$.

Since the mirror 3 is capable of travelling along the master hologram 4, the copying process in the apparatus according to the invention can be made continuous.

After the exposure of the copy hologram 5, the master hologram 4 and the copy hologram 5 are separated by the handler 20 (FIG. 3) and a new hologram is placed in the apparatus. The master and copy holograms are brought together and secured in this position to obtain a next copy. The exposed copy hologram 5 (FIG. 1) is created to obtain a positive image. The recording layer can be a layer which records the image in real time.

The herein disclosed apparatus for copying holographic diffraction gratings was used to produce copies of a holographic diffraction grating with a length of 700 mm and a frequency of 1,000 lines/mm. The accumulated error for the total copy length did not exceed the error of the original hologram and was less then 1 micrometer/m. The aperture of the collimating system was 150 mm. The length of the copy hologram was equal to that of the master hologram, which is more than the aperture of the collimating system. The mirror inclination angle was 54°23'. The speed of the mirror travel was about 0.08 cm/sec.

The proposed apparatus for copying holographic diffraction gratings permits obtaining copy hologram gratings of practically unlimited length with the accuracy equal to that of the original hologram.

Moreover, the interferential copying technique makes the life of the original hologram longer without any deterioration of its quality. This became possible because a coherent radiation source is used and the gap between the master hologram and the copy can be made sufficiently large, up to 1 mm and more, which is extremely important when the copy holograms are long and maintaining a minute gap is a complex technological and practical task.

A ready copy hologram can be obtained in 35 minutes, counting from the exposure to the ready product stage, if the size of the copy is 1 meter. This is practically 10 times less than the time required for producing the original holographic grating. This time can be still further reduced if a more sensitive recording layer is used. Mass production of holographic gratings should be based on copy holograms, the original holograms being used as master matrices for their manufacturing. One master-matrix can be used to produce not less than 100 copies.

To summarize, the proposed apparatus for copying holographic diffration gratings can be used to perform interferential copying of holographic diffraction gratings with the length more than the aperture of the collimating system, which provides a means for producing copy holograms of great length.

In the description of the preferred embodiment of the present invention specific narrow terminology is resorted to for clarity. However, the invention is in no way limited to the terminology thus adopted and it should be remembered that each such term is used to denote all equivalent elements functioning in an analogous way and employed for similar purposes.

While particular embodiments of this invention have been shown and described, it is understood that numerous variations and changes may be made without departing from the spirit and scope of the invention, which is apparent to those skilled in the art.

These variations and changes may be made without affecting the scope and spirit of the invention and the appended claims.

What is claimed is:

1. An apparatus for copying holographic diffraction gratings, comprising:
   a source of coherent radiation, which emits coherent radiation;
   a collimating system placed directly after said coherent radiation source in the direction of said radiation;
   a mirror placed directly after said collimating system in the direction of said coherent radiation and adapted for reciprocal travel;
   a master holographic diffraction grating placed directly after said mirror in the direction of said coherent radiation and comprising a substrate having a first extended surface along which said travel of said mirror is performed so that said coherent radiation reflected by said mirror falls on said first extended surface and a second extended surface, and a recording layer applied on the second extended surface;
   a copy holographic grating placed directly after said master holographic grating in the direction of said coherent radiation, rigidly secured to said master holographic grating and comprising a substrate having a first extended surface facing said recording layer of said master holographic grating, a second extended surface, and a recording layer applied on the first extended surface.

2. An apparatus as claimed in claim 1, wherein:
said mirror is arranged, in relation to said master holographic grating, at an angle $\alpha = 45° + (Q/4)$, where $Q/2$ is the angle between the direction of said coherent radiation and the normal to the first extended surface of said master holographic grating.

* * * * *